April 26, 1955  O. SUTER  2,706,860
PIVOT SUSPENSION FOR WELL SURVEY INSTRUMENTS
Filed July 9, 1951  2 Sheets-Sheet 2
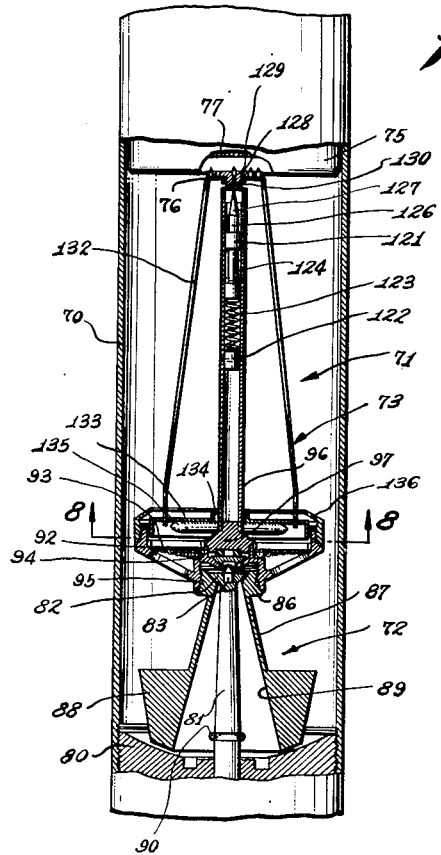
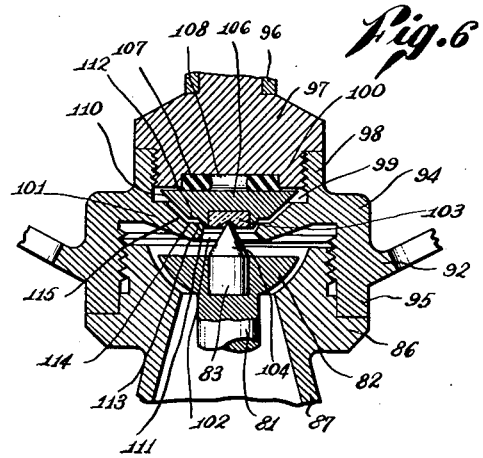
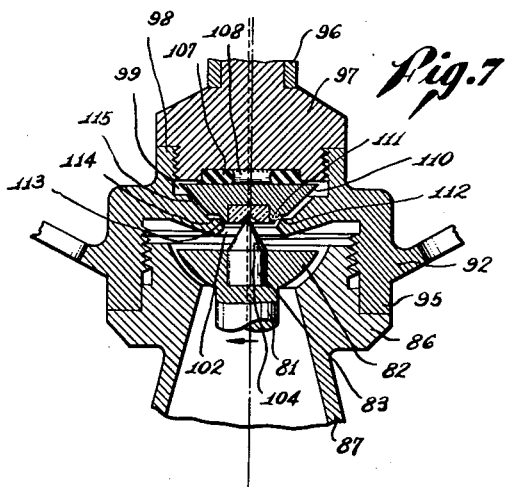
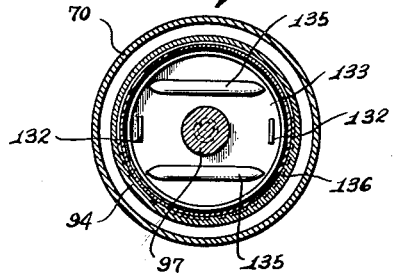
INVENTOR.
OSWALD SUTER
BY Fulwider & Mattingly
Attorneys

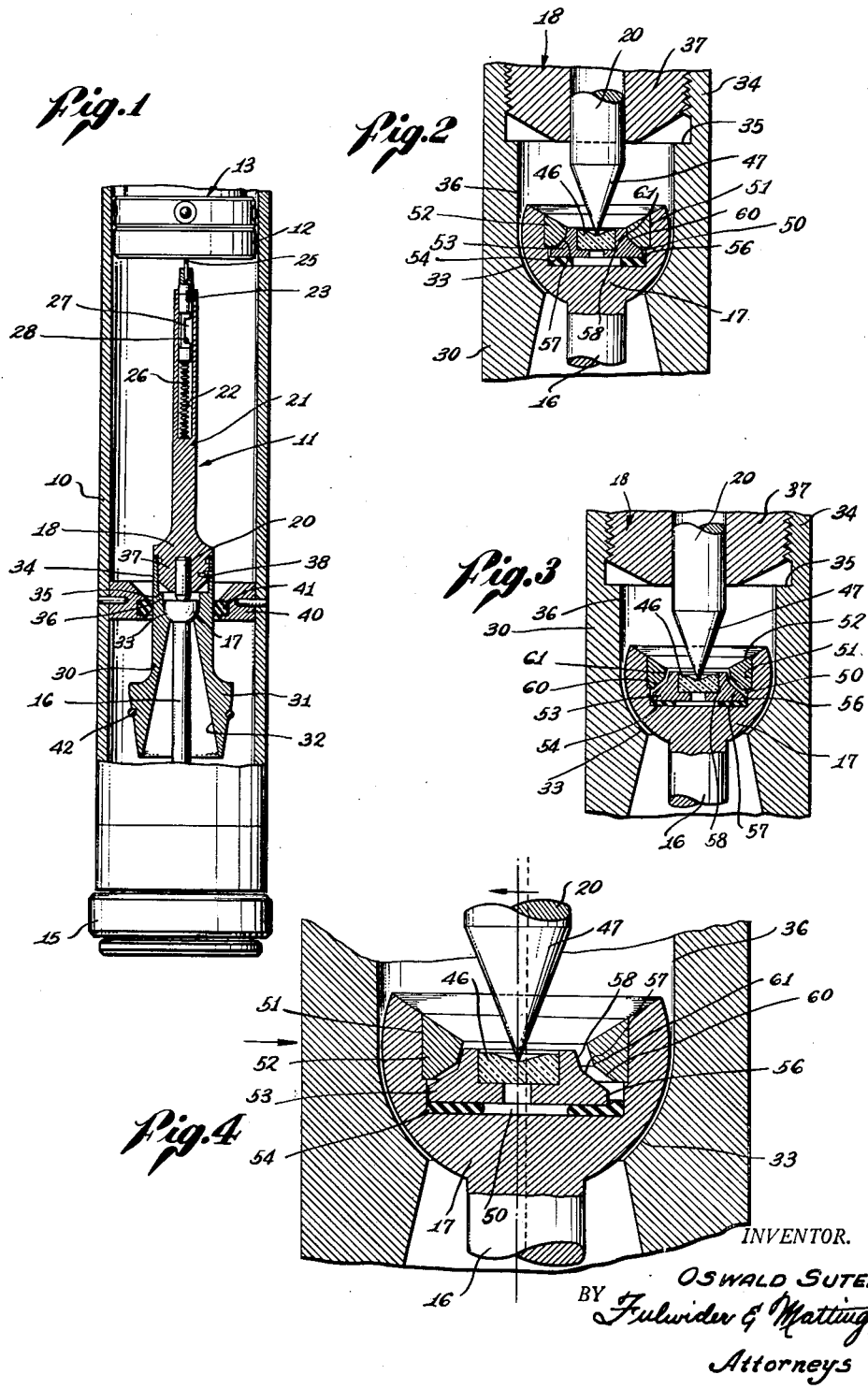

United States Patent Office 2,706,860
Patented Apr. 26, 1955

2,706,860

PIVOT SUSPENSION FOR WELL SURVEY INSTRUMENTS

Oswald Suter, Los Angeles, Calif., assignor to Technical Oil Tool Corporation, Ltd., Los Angeles, Calif., a corporation of California Application July 9, 1951, Serial No. 235,879

7 Claims. (Cl. 33—205.5)

My invention relates generally to well survey instruments, and more particularly to improved pivotal mountings for indicating and marking elements used therein.

In the well drilling art, many specialized indicating and recording instruments are used to determine relative angular measurements, such as the orientation of a well bore with respect to the vertical. Pivotally mounted compass and pendulum means serve to establish reference axes within these instruments, and in order to swing freely must be supported by substantially frictionless bearings. Any friction or eccentricity of the support bearings will cause deviation from the true reference axes, and produce erroneous measurements. For this reason, it is very important that the bearings be protected from vibration, shocks, and other causes of wear and distortion.

While my improved pivotal mountings are not restricted to use in any particular type of survey apparatus, they may be conveniently illustrated in connection with positive recording inclination and directional instruments of the type in which a mark or group of marks is impressed on a permanent chart. To effect the recording in these devices, an indicating body or angle marker is pivotally mounted within a tubular housing and is adapted for engagement with a relatively movable chart. The resultant marks made on the chart indicate the inclination between the well bore and the vertical, and in some types of instruments also indicate the azimuthal direction or heading of the bore.

One embodiment of my invention is herein described in conjunction with a particular instrument for recording both inclination and azimuthal direction, that is fully disclosed in the copending application of Arthur R. Barnett et al., Serial No. 205,091, filed January 9, 1951 for "Directional Inclination Recording Apparatus." In the aforementioned device, an angle marker has an annular dependent pendulum body mounted on a single main pivot to remain in the true vertical when the housing of the instrument is inclined. Supported rotatably on the upper portion of the angle marker is a compass and marking head assembly having a bar magnet which seeks the magnetic north pole. The marking head is supported by secondary rotatable pivot bearings and is free to swing with the bar magnet to establish a directional reference axis.

As shown in the aforementioned application, the marking head and bar magnet are connected together by an elongated rotatable shaft which must be supported by both upper and lower bearings. These bearings cause a substantial amount of friction if there is any bending or distortion of the shaft, and it has been found that the construction is very delicate and susceptible to damage. I have improved the suspension of the compass assembly by the use of a single rotatable pivot bearing and an annular supporting framework which is dependent therefrom. The center of gravity of the framework is below the point of suspension and the assembly is balanced and poised so that the lower portion thereof is free for rotation without the use of lower bearings.

In order to support the compass pivot bearing it is necessary to provide a rigid upper column, and this increases the weight of the counterbalancing pendulum body, creating additional pressure on the main pivot bearing. I have therefore found it particularly advantageous to protect the bearing elements of the main pivot against wear in this device, and have accordingly provided a cushioned main pivot mounting as will be described herein.

Another embodiment of my invention is adapted for use with an inclination instrument of the type which records only the angular amount of inclination of the well bore from the vertical. The device is fully described in the copending application of Oswald Suter et al., Serial No. 184,876, filed September 14, 1950, for "Inclination Recording Instrument." Therein an angle marker is mounted on a single main pivot which is quite similar to the main pivot of the directional instrument, but has an inverted bearing support structure. In this device I have provided a cushioned pivot mounting which protects the bearing elements against wear and damage, and is quite similar to the main bearing mounting of the directional instrument.

With the foregoing in mind, it is a major object of my invention to provide improved pivotal mountings which greatly increase the accuracy and the useful life of angle marker assemblies of the class described.

Another object of my invention is to provide a poised annular dependent compass structure and a single rotatable pivot bearing which supports said structure without the use of a lower bearing to avoid binding shaft friction.

It is also an object of my invention to provide a cushioned main pivot mounting which absorbs vibration transmitted thereto, whether radially or axially directed, and is thus able to sustain additional loads thereon.

A further object of the invention is to provide an improved pivot mounting having lateral compliance to prevent distortion or bending of the pivot cone while the instrument is being raised or lowered into the well, and which is adapted to return to exact concentricity with a pivotal axis to prevent any misalignment during the recording interval.

Still another object of my invention is to provide an improved rotatable compass structure including an upper marking head that is supported by a bearing adjacent thereto and above the center of gravity of said structure to prevent bending or distortion.

It is yet a further object of my invention to provide improved pivot mountings which are adapted to give long and trouble-free service while permitting extreme accuracy of alignment.

These and other objects and advantages of my invention will become apparent from the following detailed description thereof, and from an inspection of the accompanying drawings, in which:

Fig. 1 is a longitudinal medial view partially in section of an inclination instrument showing my improved main pivot mounting supporting an angle marking assembly therein;

Fig. 2 is an enlarged longitudinal medial section taken through the pivot mounting of Fig. 1;

Fig. 3 is a section similar to Fig. 2 showing the resiliently cushioned bearing holder in a downwardly displaced position;

Fig. 4 is a section similar to Fig. 2 showing the bearing holder displaced downwardly and laterally;

Fig. 5 is a longitudinal medial view partially in section of a directional inclination recording instrument having another embodiment of my improved main pivot mounting and also an improved annular compass and marking head assembly;

Fig. 6 is an enlarged longitudinal medial section taken through the pivot mounting of Fig. 5;

Fig. 7 is a section similar to Fig. 6 showing the bearing holder displaced upwardly; and Fig. 8 is a transverse section taken along line 8—8 of Fig. 5.

As was previously mentioned, the main pivot mountings of the angle markers for both the inclination and directional inclination instruments are similar, but constructed in inverted relationship. It is preferable to describe first the less complex pivotal mounting of the angle marker for the inclination instrument of the type disclosed in application Serial No. 184,876, as seen in Figs. 1 to 4 of the drawings. Referring particularly to Fig. 1, the lower portion of an elongated tubular housing 10 is seen to contain an indicating assembly or angle marker 11 which maintains itself in an upstanding vertical position, pivoting as the housing is inclined in accordance with the direction of the well bore. Above angle marker 11 a slidably movable chart holder 12 is mounted on the lower end of a recording element 13 (fragmentarily shown) which is concentric with housing 10. Recording element 13 has timing and operating means which move chart holder 12 downwardly at predetermined time intervals to engage with angle marker 11 and record a mark on a circular chart fitted within the holder. The mark or impression so made is positioned in accordance with the inclination of angle marker 11 from the axis of housing 10 and is thus a record of the inclination of the housing and the outer well bore.

The lower end of housing 10 is closed tightly by a circular base or closure 15 which also positions an upstanding support member or stem 16. Stem 16 is formed as an elongated cylindrical rod extended along the axis of housing 10 and supports angle marker 11 thereon. Preferably stem 16 is resiliently mounted to base 15 in the manner described in aforesaid application Serial No. 184,876, which in and of itself forms no part of the instant invention.

The upper end of stem 16 terminates in a semi-spherical head or ball 17 having an upwardly facing interior supporting seat. Angle marker 11 is formed with a circular hub member 18 which is pivotally supported on ball 17 by a downwardly projecting pin or pivot needle 20 that is aligned with the hub axis. An elongated reduced indicating pointer or neck 21 extends upwardly from hub 18 above pivot pin 20 and is provided at the top with an axial bore 22 containing a slidable plunger 23. Embedded within the top end of plunger 23 is a pointed pricker or marker 25 for engagement with chart holder 12. A spring means 26 is confined within bore 22 to urge plunger 23 resiliently upwardly, and on the side of the plunger is a slotted portion 27 cooperating with a stop pin 28 to limit the plunger travel.

In order to maintain angle marker 11 in an upstanding vertical position, a pendulum body in the form of a dependent weighted skirt 30 is attached to hub 18 and hangs downwardly about support stem 16. Skirt 30 is formed as a longitudinally elongated annular ring having an outwardly flanged lower portion 31. The interior wall of skirt 30 tapers upwardly to provide a frusto-conical bottom opening 32 in which stem 16 is freely movable. Adjacent head 17, skirt 30 has an upwardly dished interior wall or socket 33 which closely surrounds the head and is spaced slightly therefrom. Socket 33 is adapted to momentarily engage with head 17 upon a shock or impact to prevent angle marker 11 from being unseated. Normally socket 33 is not in contact with the head 17 and does not cause any friction thereon. For connection to hub 18, the upper end of skirt 30 is formed with a thin-walled internally threaded sleeve 34 which is joined to the socket 33 by an annular shoulder 35 and cylindrical section 36. Hub member 18 is provided with a downwardly projecting threaded boss 37 which is engaged firmly within sleeve 34 and may be locked thereon by a set screw 38.

It can be appreciated that any deviation of support stem 16 or angle marker 11 from the axis of housing 10 will introduce an error into the recorded angular measurement even though angle member 11 is extended in the true vertical. This error which may be designated as one of concentricity, results from the fact that marks made on the circular chart must be subsequently read with reference to the center. If the center of the chart and the tip of angle member 11 are not in alignment when the true inclination is zero, an error will be introduced. This is the result of bending stem 16 or causing angle marker 11 to be displaced laterally.

To prevent bending of stem 16 due to shocks or impacts an annular bumper 40 is rigidly mounted in housing 10 and surrounds skirt 30 at the level of ball 17. On the inner edge of bumper 40 a resilient O-ring 41 is mounted to cushion contact with skirt 30. Ring 41 is spaced slightly from skirt 30 to allow free pivoting and rotation of the latter, but is sufficiently close to prevent any transverse movement thereof. Thus it can be seen that stem 16 is effectively supported against bending from the axis of housing 10. As a further protection to angle marker 11 and stem 16, a resilient O-ring 42 is attached to the outer surface of skirt flange 31 to cushion contact with the wall of housing 10 in the event the angle marker oscillates in a wide arc before coming to rest.

The details of the pivotal bearing means can best be seen in Figs. 2 to 4. At the center of the upper face of support ball 17, a jewel bearing element 46 is mounted for engagement with a cooperating bearing element in the form of a conically pointed tip 47 at the lower end of pivot pin 20. Tip 47 is sharply tapered, while bearing 46 is provided with a shallow, inverted conical surface so that there is substantially a single point of bearing contact. This type of single-point suspension permits extreme accuracy of alignment, and also reduces the contact friction to a minimum. Preferably, bearing 46 is a hard jewel such as a sapphire, and pin 20 is made of an alloy steel which is also relatively hard.

It can be appreciated that in order to maintain angle marker 11 in a true vertical position it must be exactly balanced or poised on the pivot pin 20. The weight of the assembly is accurately balanced and calibrated during the construction of the instrument, and initially the angle marker is aligned with a true reference axis to within one or two minutes of arc. Thereafter, this calibration will remain so long as there is no distortion or wear of the pivot assembly.

While I have described the means by which the support stem 16 is protected from heavy shock, there is nevertheless a certain amount of vibration and minor shock waves which reach support ball 17. Also, harmonic vibration may be induced in angle marker 11 due to its inertia, and there is therefore a tendency for pivot tip 47 to pound or hammer against jewel 46. This motion may be transverse as well as longitudinally directed, with the result that tip 47 tends to wear and take a distorted shape. When this occurs, angle marker 11 is no longer poised and does not stand in the true vertical.

In order to protect pivot tip 47 from wear, I mount jewel 46 in a resilient mounting which is sufficiently pliable to yield before the tip is damaged. To this extent the solution of the problem may be regarded as conventional, but it must be kept in mind that no axial deviation of jewel 46 is permissible during the recording interval if errors of concentricity are to be avoided. In other words, it is desirable that jewel 46 be mounted for both axial and lateral movement during the time the instrument is subjected to vibration and shock, but it is also essential that the jewel be held in exact axial alignment when the instrument is at rest and the angle marking is effected.

To meet these requirements, jewel bearing 46 is mounted within aligning means which permits both lateral and axial movement, but always returns the bearing to exact concentricity with ball 17. Structurally considered, an upwardly open cylindrical chamber 50 is bored into ball 17 to a depth considerably greater than the length of jewel 46. The upper portion of chamber 50 is counterbored at 51 to take an annular aligning ring 52 which projects inwardly to overhang a portion of the lower chamber. The upper faces of ball 17 and aligning ring 52 are joined smoothly along a frusto-conical outwardly divergent surface so as to avoid any possible contact with pivot pin 20 when the latter is pivoted on jewel 46.

Jewel 46 is seated firmly within a circular holder 53 that is supported in chamber 50 by a resilient cushion 54. Cushion 54 is preferably formed of an oil-resistant synthetic rubber compound such as neoprene, and is a relatively thin, flat annular ring which is yieldable to allow limited downward displacement of holder 53. This, of course, permits the desired axial movement of jewel 46. To permit lateral movement, the lower portion of holder 53 is formed with a short cylindrical lower wall 56 which is of somewhat smaller diameter than that of chamber 50, and fits loosely therein. Above lower wall 56, holder 53 is provided in an upwardly converging central wall 57 which joins a flatly tapered convergent upper wall or centering boss 58. Preferably wall 57 makes approximately a 45° angle with the vertical, while boss 58 lies about 10° away from the vertical.

Aligning ring 52 is formed with a chamfered or undercut lower edge 60 which is complemental to intermediate wall 57, and is also provided with an interior upper sleeve surface 61 which is complemental to boss 58. Both of these surfaces of ring 52 are sized to exact fit with the corresponding wall surfaces of holder 53, and are adapted to bear tightly thereon when the holder is in its normal position. As can be appreciated, the engagement between boss 58 and sleeve 61 in particular positions jewel 46 in exact concentricity with the axis of stem 16 and support ball 17 and prevents any lateral movement.

When jewel 46 receives vibrational impacts tending to force it downwardly or laterally, cushion 54 yields to permit downward movement of holder 53. This position of holder 53 is best seen in Fig. 3, and it should be noted that holder walls 57 and 58 move out of engagement with the corresponding ring surfaces 60 and 61. Thus, if there is an additional lateral component of force acting upon jewel 46, holder 53 is free to move laterally within chamber 46, as is illustrated in Fig. 4.

When the vibrational forces cease, the restoring force of cushion 54 urges holder 53 upwardly to again assume the position shown in Fig. 2. As can be understood, holder 53 is centered within ball 17 during its upward travel by the camming engagement of ring surface 60 upon the holder wall 57 to force boss 58 into register with sleeve 61. Thus the holder 53 is in effect self-aligning and will always return to exact concentricity with stem 16 after being displaced. At the same time the cushioning serves to prevent wear between the pivot contact surfaces. This feature greatly increases the useful life of the instrument, and avoids erroneous readings such as will be introduced if any wear in the bearing elements has occurred.

In Figs. 5 through 8, I have illustrated another embodiment of my invention which is adapted for use on a directional inclination instrument of the type disclosed in the aforementioned application Serial No. 205,091. Referring particularly to Fig. 5, an elongated tubular housing 70 contains an indicating assembly or angle marker 71 which includes a lower pendulum means 72 and an upper compass means 73. Angle marker 71 is maintained in an upstanding position by pendulum means 72 to establish a vertical reference axis, and compass means 73 are rotatably mounted thereon to establish an azimuthal reference axis. A slidably movable chart holder 75 is suspended above angle marker 71 and is operatively associated with an upper recording and timing element (not shown). At selected time intervals, chart holder 75 is reciprocated along the axis of housing 70 to cause positive engagement between an angle marking head 76 and a circular chart 77 positioned within the holder. Head 76 is vertically positioned by pendulum means 72 and is rotated by compass means 73 so as to record both the inclination of the well bore from the vertical, and the azimuthal direction or heading of the bore with reference to the magnetic North. The manner in which the chart is impressed and subsequently measured is fully described in aforesaid application Serial No. 205,091, and need not be repeated herein.

The lower end of housing 70 is closed by a circular base 80 on which is mounted an upstanding support member or stem 81 extended the axis of housing 70. Stem 81 is formed as a tapered elongated rod having a frusto-spherical head or ball at the upper end. The top face of ball 82 is flat, and projecting upwardly therefrom is a short pivot pin 83 which serves as a main pivotal bearing element for the entire angle marker 71. Surrounding ball 82 is a socket member 86 which is in turn joined to a dependent lower skirt 87 forming the body of pendulum means 72. Normally, socket member 86 is spaced outwardly from ball 82 a sufficient distance so that there is no frictional contact during the relative pivotal movement, but in the event of a shock tending to lift angle marker 71 from pivot pin 83, the socket member and ball will momentarily engage to prevent the angle marker from becoming unseated.

Skirt 87 extends outwardly and downwardly to a lower annular flange 88 that serves as a pendulum weight. The interior of skirt 87 defines a conical chamber 89 around stem 81 and thus permits the skirt to hang in the true vertical as the stem is inclined. To prevent damage to the assembly upon excessive oscillation of skirt 87, an annular cushion ring 90 may be secured to the lower portion of stem 81 and extended outwardly therearound.

Above the skirt 87, angle marker 71 is formed with an enlarged container or circular shell 92 which tapers upwardly in a bowl shape to define an upwardly open chamber 93. Shell 92 is joined integrally with a central hub member 94 that is spaced above ball 82 and contains a cooperative element supported on pivot pin 83. Connecting shell 92 with skirt 87 is a sleeve 95 projected downwardly from hub 94 and threadedly engaged within socket member 86. To provide rotatable support for the upper marking head 76 and compass orienting means (later to be described), a rigid upper column in the form of an elongated tubular neck 96 is extended above hub member 94 along the vertical axis through pivot pin 83, and is connected thereon by an enlarged base flange 97.

The details of the main pivotal bearing supported within hub 94 are best seen in Figs. 6 and 7. The upper end of hub 94 carries a reduced sleeve 98 which is counterbored and internally threaded to engage with a reduced externally threaded boss 100 formed on flange 97. Boss 100 does not extend to the bottom of sleeve 98 and thus provides a shallow cylindrical chamber 99 therein. The central portion of hub 94 is provided with a bottom wall or retaining ring 101 which is bulged downwardly along a frusto-conical surface terminated by central aperture 102. Positioned in superjacent relationship to aperture 102 is a jewel bearing element 103 formed with a shallow conical seat therein. Pivot pin 83 is formed with a sharply tapered tip 104 which extends upwardly into the apex of jewel seat 103 and engages therein substantially a single point of contact. This bearing contact supports the entire angle marker assembly 71 for relative pivotal movement upon support stem 81, and the angle marker is poised and balanced so that it is always maintained in a true vertical position.

In order to prevent wear and friction in the bearing elements, it is desirable to support jewel 103 for limited axial and lateral movement relative to hub 94. Such a construction is very essential in this form of the invention because of the relatively heavy structure which must be provided to support elevated compass means 73, and the additional counterbalancing weight which must be added to pendulum flange 88. The cumulative weight of this structure causes additional downward pressure on pivot tip 104 and increases the danger of wear and damage to the latter. This cushioning must, of course, be done without introducing any errors of concentricity, as have been previously discussed.

Jewel 103 is mounted in a circular holder 106 which lies within chamber 99 and normally seats downwardly against ring 101. Above holder 106 is a resilient cushion 107 preferably in the form of an O-ring of synthetic rubber composition or the like. A recessed counterseat 108 is formed in boss 100 to contain the ring 107 which overhangs the seat and extends partially into chamber 99. Holder 106 is of generally conical shape having a steeply tapered upper wall 110 joined to a flatly tapered lower boss 111 by horizontal shoulder or groove 112. The largest diameter of holder 106 is smaller than that of chamber 99, and the holder may therefore move laterally unless otherwise held. For the purpose of centering and aligning holder 106, the upper surface of ring 101 is shaped with a chamfered edge 113 to receive boss 111, a shoulder 114, and a tapered wall 115 to engage, respectively, with shoulder 112 and wall 110. Normally, ring surfaces are tightly engaged with corresponding surfaces of holder 106 and the latter is exactly centered within the hub.

When the angle marker assembly 71 receives a shock exerting downward pressure against pivot pin 83, resilient cushion 107 yields and allows holder 106 to move upwardly as shown in Fig. 6. In this position, boss 112 has moved out of the aligning ring edge 113 and holder wall 110 is likewise spaced from ring surface 115. As can be understood, holder 106 is then free for limited lateral movement as is indicated in Fig. 7. Since the elastic modulus of resilient cushion 107 is considerably less than that of pivot tip 104, both axial and lateral movement of holder 106 may occur before damage is done to the pivot surface. After the momentary shock or jar has subsided, the restoring force of cushion 107 tends to drive holder 106 downwardly to its normal seated position. During this travel, holder wall 110 cams against ring surface 115 and moves holder boss 112 into register with ring edge 113, so that as holder 106 drops downwardly, it is again exactly concentric with hub 94. Thus it can be seen that the cushioning action of this form of my invention is generally similar to the previously described alternate form.

It will be remembered that it is one object of this form of the invention to provide a single rotatable pivot bearing for the compass assembly 73 and thus eliminate the problems of multiple bearing alignment and shaft distortion. At the same time, I wish to retain the advantages of having the compass means mounted as a unitary structure with the pendulum means for the reasons set forth in aforementioned application Serial No. 205,091.

To support the rotatable bearing means, tubular column 96 is provided with an upper movable plunger 121 which is supported on a fixed stop plug 122 by resilient means, such as a coil spring 123. Movement of plunger 121 is preferably limited by an elongated groove and pin means 124, and as can be understood, the plunger is adapted to yield downwardly under excessive pressure. Projecting upwardly from the top of plunger 121 is a pivot pin 126 having a conically tapered tip 127 which is aligned with the vertical reference axis of the indicating assembly, and forms one bearing element of the rotatable pivot bearing. The other bearing element is formed by a small jewel 128 which is seated in rotatable engagement with pivot tip 127.

Above column 96 is marking head 76 which is formed with a lower boss 129 which fits loosely within the column mouth and carries jewel bearing 128 therein. Boss 129 joins head 76 along a shoulder 130 which is normally spaced above column 96. When pivot tip 127 yields downwardly, shoulder 130 engages the rim of column 96 and limits the downward travel of the compass assembly. Because bearing 127—128 is immediately adjacent head 76 it can be appreciated that pressures exerted on the head by reason of engagement with chart 77 are absorbed in spring means 123 without bending or distortion of the head or support column 96.

Extending outwardly and downwardly from head 76 is an annular compass framework comprising a pair of diametrically spaced arms 132 connected rigidly to a lower annular disk or plate 133 which lies above shell 92 within chamber 93. At the center of disk 133 is an enlarged central opening 134 which loosely surrounds column 96. Disk 133 carries on its lower side a pair of spaced parallel bar magnets 135, as are best seen in Fig. 8. Magnets 135 are equidistantly spaced from the axis of column 96, and have like end polarity to produce the effect of a single diametrically extending magnet. At the same time, magnets 135 permit the use of a rigid central support for the assembly. Head 76 is aligned parallel to magnets 135 and is connected for rotation by the latter to indicate the azimuthal direction of the compass assembly.

Magnets 135 tend to align with the magnetic polar axis and orient the compass assembly to establish a known reference axis for recording purposes. The center of gravity of the compass assembly is substantially below the pivot point of bearing 127—128 and in effect creates a secondary pendulum body holding disk 133 in concentricity with center column 96. To insure this result the compass assembly is accurately poised before assembly of the instrument. Thus the edge of enlarged opening 134 remains spaced from column 96 and there is no binding friction thereon. To prevent any possible unseating of the compass assembly from the pivot bearing I provide an annular retaining ring 136 which is engaged with shell 92 and overhangs disk 133 to limit upward movement. It can therefore be fully appreciated that I have gained the advantages of a single pivot support for the compass assembly, and at the same time provided a unitary angle marker of simple construction.

While I have described specific embodiments of my invention which are adapted for particular inclination and directional instruments, it will be apparent to those skilled in the art that the invention may be utilized on other types of well survey instruments. Therefore, I do not wish to be limited to the details described herein, except as defined in the appended claims.

I claim:

1. In a well survey instrument, an angle marker assembly comprising: a stem extending upwardly in said instrument; a pendulum body having a dependent weighted skirt surrounding said stem; a two-part pivot bearing supporting said body on said stem, one element of said bearing being rigidly mounted and the other element being resiliently cushioned for limited axial and lateral displacement; aligning means associated with the displaceable bearing element and normally holding said element in exact concentricity with said pendulum body, said means being shaped to move said element to the normal position upon return from a displaced position; yieldable cushion means urging said element to said normal position; a rigid support column extending upwardly from said pendulum body on the axis of said pivot bearing; and compass means pivotally mounted on said support column, said compass means including an upper marking head, a pair of magnets extending parallel to each other and said head and spaced equidistantly from said support column below said head, and a framework connecting said magnets and said head, said compass means having a center of gravity below the pivot point and being poised on the support column to maintain said means spaced from binding contact thereon.

2. In a well survey instrument, an angle indicating assembly comprising: a tubular housing; a stem mounted in said housing and extending upwardly along the axis thereof, said stem having a frusto-spherical head member at the upper end thereof; a pendulum body pivotally mounted on said stem by a central hub member, said body having a complemental socket loosely surrounding said head member and a dependent weighted skirt overhanging said stem; a pivot pin extended between said members and rigidly connected to one of said members; a cylindrical chamber in the other of said members; a circular holder fitted loosely in said chamber for limited axial and lateral movement; a bearing fixed in said holder for seating engagement with said pivot pin; an aligning ring fixed to said last-mentioned member at the end of said chamber and having a generally conical surface complemental to said holder to normally center said holder in exact concentricity therein; cushion means within said chamber on the opposite side of said holder to said ring to yieldably seat said holder in the normal position; a compass shell joined to said pendulum body and extending upwardly to define an upwardly open compass chamber; an elongated rigid support column extending upwardly from said hub member; a secondary pivot pin yieldably mounted on said support column; an indicating head having a lower bearing rotatably mounted on said secondary pivot pin; arms extended downwardly from said indicating head into said shell; spaced parallel magnet means connected to said arms and equidistantly spaced from said column within said shell, the structure formed by said magnet means, arms and head having a center of gravity below said secondary pivot pin and being poised thereon so that said magnet means are maintained free from binding contact with said column; and a retaining ring connected to said shell and overhanging said magnet means to prevent the unseating of said head from said secondary pivot.

3. In a well survey instrument, an angle marker assembly comprising: a tubular housing; a stem mounted in said housing and extending upwardly along the axis thereof, said stem having a frusto-spherical head member at the upper end thereof; a pendulum body pivotally mounted on said stem by a central hub member, said body having a complemental socket loosely surrounding said head member and a dependent weighted skirt overhanging said stem; a pivot pin fixed in said stem head member and having a generally conical tip projecting upwardly therefrom; a cylindrical chamber bored upwardly into said hub member; a generally conical holder fitted loosely in said chamber for limited axial and lateral movement; a jewel bearing fitted in said holder and having a shallow conical seat for cooperative engagement with said pivot tip; an aligning ring connected to said hub member at the bottom of said chamber and having a generally conical interior surface complemental to said holder to normally center said holder in exact concentricity therein; a resilient rubber-like ring within said chamber on the opposite side of said holder to said ring to yieldably seat said holder in the normal position; an elongated rigid support column extending upwardly from said hub member; a secondary pivot pin yieldably mounted on said support column; and compass means pivotally mounted on said secondary pivot pin, said compass means including an upper marking head, a pair of magnets extending parallel to each other below said head and spaced equidistantly from said support column, and a framework connecting said magnets and said head, said compass means having a center of gravity below the secondary pivot pin and being poised on the support column to maintain said means spaced from binding contact thereon.

4. In a well survey instrument, an angle indicating assembly comprising: a tubular housing; a stem mounted in said housing and extending upwardly along the axis thereof, said stem having a frusto-spherical head member at the upper end thereof; an indicating body pivotally mounted on said stem by a central hub member, said body having a complemental socket loosely surrounding said head member and a dependent weighted skirt overhanging said stem; angle marking means mounted at the top of said indicating body; a pivot pin fixed in said hub member and having a generally conical tip projecting downwardly therefrom; an open-ended cylindrical chamber bored in the top of said head member; a generally conical holder fitted loosely in said chamber for limited axial and lateral movement; a jewel bearing fitted in said holder and having a shallow conical seat for cooperative engagement with said pivot tip; an aligning ring connected to said head member at the open end of said chamber and having a generally conical interior surface complemental to said holder to normally center said holder in exact concentricity therein; and a resilient rubber-like ring within said chamber on the opposite side of said holder to said ring to yieldably seat said holder in the normal position.

5. In an indicating assembly for a well survey instrument: a tubular housing; a stem mounted in said housing and extending upwardly along the axis thereof, said stem having a frusto-spherical head member at the upper end thereof; an indicating body pivotally mounted on said stem by a central hub member, said body having a complemental socket loosely surrounding said head member and a dependent weighted skirt overhanging said stem; angle marking means mounted at the top of said indicating body; a pivot pin fixed in said stem head and having a generally conical tip projecting upwardly therefrom; an open-ended cylindrical chamber bored upwardly into said hub member; a generally conical holder fitted loosely in said chamber for limited axial and lateral movement; a jewel bearing fitted in said holder and having a shallow conical seat for cooperative engagement with said pivot tip; an aligning ring connected to said hub member at the open end of said chamber and having a generally conical interior surface complemental to said holder to normally center said holder in exact concentricity therein; and a resilient rubber-like ring within said chamber on the opposite side of said holder to said ring to yieldably seat said holder in the normal position.

6. In an indicating assembly for a well survey instrument: a tubular housing; a stem mounted in said housing and extending upwardly along the axis thereof, said stem having a frusto-spherical head member at the upper end thereof; an indicating body pivotally mounted on said stem by a central hub member, said body having a complemental socket loosely surrounding said head member and a dependent weighted skirt overhanging said stem; angle marking means mounted at the top of said indicating body; a pivot pin fixed in one of said members and having a generally conical tip projecting therefrom; an open-ended cylindrical chamber bored into the other of said members; a generally conical holder fitted loosely in said chamber for limited axial and lateral movement; a jewel bearing fitted in said holder and having a shallow conical seat for cooperative engagement with said pivot tip; an aligning ring connected to said other of said members at the open end of said chamber and having a generally conical interior surface complemental to said holder to normally center said holder in exact concentricity therein; and a resilient rubber-like ring within said chamber on the opposite side of said holder to said ring to yieldably seat said holder in the normal position.

7. In an indicating assembly for a well survey instrument: a tubular housing; a stem mounted in said housing and extending upwardly along the axis thereof, said stem having a frusto-spherical head member at the upper end thereof; an indicating body pivotally mounted on said stem by a central hub member, said body having a complemental socket loosely surrounding said head member and a dependent weighted skirt overhanging said stem; angle marking means mounted at the top of said indicating body; a pivot pin fixed in one of said members and having a generally conical tip projecting therefrom; an open-ended cylindrical chamber bored into the other of said members; a generally conical holder fitted loosely in said chamber for limited axial and lateral movement; a bearing fitted in said holder and having a shallow conical seat for cooperative engagement with said pivot tip; an aligning ring connected to said other of said members at the open end of said chamber and having a generally conical interior surface complemental to said holder to normally center said holder in exact concentricity therein; and a resilient pad within said chamber on the opposite side of said holder to said ring to yieldably seat said holder in the normal position.

References Cited in the file of this patent

UNITED STATES PATENTS

| | | |
|---|---|---|
| 448,896 | Villon | Mar. 24, 1891 |
| 465,308 | Wrigley et al. | Dec. 15, 1891 |
| 943,890 | Prisont | Dec. 21, 1909 |
| 1,469,079 | Glenn | Sept. 25, 1923 |
| 1,574,452 | South | Feb. 23, 1926 |
| 1,843,868 | Copelin | Feb. 2, 1932 |
| 2,015,905 | Marti | Oct. 1, 1935 |
| 2,058,004 | De Beeson | Oct. 20, 1936 |
| 2,109,690 | Culbertson | Mar. 1, 1938 |
| 2,205,022 | Tipter | June 18, 1940 |
| 2,239,682 | Marti | Apr. 29, 1941 |
| 2,272,336 | Colomb | Feb. 10, 1942 |
| 2,272,546 | Colomb | Feb. 10, 1942 |
| 2,364,908 | Miller | Dec. 12, 1944 |
| 2,437,132 | Sinks | Mar. 2, 1948 |
| 2,471,618 | Green | May 31, 1949 |

FOREIGN PATENTS

| | | |
|---|---|---|
| 4,883 | Great Britain | 1908 |